United States Patent
Johnsson et al.

(10) Patent No.: US 11,140,055 B2
(45) Date of Patent: Oct. 5, 2021

(54) METHOD AND APPARATUS FOR ENABLING ACTIVE MEASUREMENTS IN INTERNET OF THINGS (IOT) SYSTEMS

(71) Applicant: Telefonaktiebolaget LM Ericsson (publ), Stockholm (SE)

(72) Inventors: Andreas Johnsson, Uppsala (SE); Christofer Flinta, Stockholm (SE); Christian Rohner, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/634,557

(22) PCT Filed: Aug. 24, 2017

(86) PCT No.: PCT/EP2017/071355
§ 371 (c)(1),
(2) Date: Jan. 27, 2020

(87) PCT Pub. No.: WO2019/037856
PCT Pub. Date: Feb. 28, 2019

(65) Prior Publication Data
US 2020/0267068 A1    Aug. 20, 2020

(51) Int. Cl.
*H04W 4/00* (2018.01)
*H04L 12/26* (2006.01)
(Continued)

(52) U.S. Cl.
CPC ........ *H04L 43/0841* (2013.01); *H04L 43/106* (2013.01); *H04W 24/04* (2013.01); *H04W 24/10* (2013.01)

(58) Field of Classification Search
CPC .. H04L 43/0841; H04L 43/106; H04W 24/04; H04W 24/10
See application file for complete search history.

(56) References Cited

U.S. PATENT DOCUMENTS 6,363,056 B1    3/2002    Beigi et al.
6,493,755 B1    12/2002   Hansen et al.
(Continued)

FOREIGN PATENT DOCUMENTS

WO    2015/038604 A1    3/2015
WO    2016/115406 A1    7/2016

OTHER PUBLICATIONS

Baillargeon et al., "Ericsson Two-Way Active Measurement Protocol (TWAMP) Value-Added Octets", Internet Engineering Task Force (IETF), Request for Comments: 6802, Nov. 2012, pp. 1-16.
(Continued)

*Primary Examiner* — Abdelnabi O Musa
(74) *Attorney, Agent, or Firm* — Nicholson De Vos Webster & Elliott LLP

(57) ABSTRACT

A first network device enables active measurement in a network path between a second network device acting as a controller of a network performance observability protocol and a wireless device. The first network device captures a measurement packet from the second network device; determines a destination of the measurement packet; and determines a measurement model associated with the destination. The measurement model represents a correspondence between one or more parameters related to the wireless device and estimated values of a measurement for the wireless device. The first network device determines a current value of a parameter related to the wireless device; determines, based on the current value of the parameter and the measurement model, a current estimation of the measurement for the wireless device; and responds to the measurement packet based on the current estimation of the measurement while avoiding to transmit the measurement packet to the wireless device.

36 Claims, 11 Drawing Sheets

(51) Int. Cl.
　　　*H04W 24/04*　　　(2009.01)
　　　*H04W 24/10*　　　(2009.01)

(56) References Cited

U.S. PATENT DOCUMENTS

| | | | |
|---|---|---|---|
| 6,560,648 B1 | 5/2003 | Dunn et al. | |
| 6,763,380 B1 | 7/2004 | Mayton et al. | |
| 7,636,321 B1* | 12/2009 | Iannaccone | H04L 43/0864 370/252 |
| 8,018,943 B1 | 9/2011 | Pleshek et al. | |
| 8,098,677 B1 | 1/2012 | Pleshek et al. | |
| 8,600,726 B1 | 12/2013 | Varshney et al. | |
| 9,400,682 B2 | 7/2016 | Persikov et al. | |
| 9,658,937 B2 | 5/2017 | Christodorescu et al. | |
| 10,264,020 B1 | 4/2019 | Nanda et al. | |
| 10,411,985 B1 | 9/2019 | Miller et al. | |
| 2002/0120727 A1 | 8/2002 | Curley et al. | |
| 2002/0131369 A1 | 9/2002 | Hasegawa et al. | |
| 2002/0161755 A1* | 10/2002 | Moriarty | H04L 63/1441 |
| 2006/0039538 A1 | 2/2006 | Minnis et al. | |
| 2006/0072466 A1 | 4/2006 | Wang et al. | |
| 2006/0294439 A1 | 12/2006 | Rolia et al. | |
| 2007/0281623 A1 | 12/2007 | Liu | |
| 2009/0150996 A1 | 6/2009 | Haswell | |
| 2009/0172148 A1 | 7/2009 | Underwood | |
| 2011/0004698 A1 | 1/2011 | Wu | |
| 2012/0079107 A1 | 3/2012 | Williams et al. | |
| 2013/0006601 A1 | 1/2013 | Mlinarsky et al. | |
| 2013/0031233 A1 | 1/2013 | Feng et al. | |
| 2013/0036416 A1 | 2/2013 | Raju et al. | |
| 2013/0291109 A1 | 10/2013 | Staniford et al. | |
| 2014/0157407 A1 | 6/2014 | Krishnan et al. | |
| 2014/0229605 A1 | 8/2014 | Besser | |
| 2014/0310377 A1 | 10/2014 | Matsuoka | |
| 2014/0337674 A1 | 11/2014 | Ivancic et al. | |
| 2014/0351414 A1 | 11/2014 | Rosensweig et al. | |
| 2015/0044973 A1* | 2/2015 | Siomina | H04W 24/10 455/67.11 |
| 2015/0244617 A1 | 8/2015 | Nakil et al. | |
| 2015/0263889 A1 | 9/2015 | Newton | |
| 2015/0319030 A1 | 11/2015 | Nachum | |
| 2015/0326457 A1 | 11/2015 | Wu et al. | |
| 2015/0333993 A1* | 11/2015 | Welin | H04W 24/08 370/252 |
| 2016/0014073 A1 | 1/2016 | Reddy et al. | |
| 2016/0026789 A1 | 1/2016 | Martini et al. | |
| 2016/0048407 A1 | 2/2016 | Alicherry et al. | |
| 2016/0087861 A1 | 3/2016 | Kuan et al. | |
| 2016/0094418 A1 | 3/2016 | Raney | |
| 2016/0099853 A1 | 4/2016 | Nedeltchev et al. | |
| 2016/0110211 A1 | 4/2016 | Karnes | |
| 2016/0149788 A1 | 5/2016 | Zhang et al. | |
| 2016/0226726 A1 | 8/2016 | Rao | |
| 2016/0274991 A1 | 9/2016 | Christodorescu et al. | |
| 2016/0277249 A1 | 9/2016 | Singh et al. | |
| 2016/0283307 A1 | 9/2016 | Takeshima et al. | |
| 2016/0357424 A1 | 12/2016 | Pang et al. | |
| 2016/0357957 A1 | 12/2016 | Deen et al. | |
| 2016/0359889 A1 | 12/2016 | Yadav et al. | |
| 2016/0359913 A1 | 12/2016 | Gupta et al. | |
| 2016/0380865 A1 | 12/2016 | Dubal et al. | |
| 2017/0041750 A1* | 2/2017 | Jose | G01S 5/10 |
| 2017/0060628 A1 | 3/2017 | Tarasuk-Levin et al. | |
| 2017/0075710 A1 | 3/2017 | Prasad et al. | |
| 2017/0078198 A1 | 3/2017 | Nellikar et al. | |
| 2017/0099195 A1 | 4/2017 | Raney | |
| 2017/0111246 A1 | 4/2017 | Shaw et al. | |
| 2017/0118102 A1 | 4/2017 | Majumder et al. | |
| 2017/0163510 A1 | 6/2017 | Arora et al. | |
| 2017/0171159 A1 | 6/2017 | Kumar et al. | |
| 2018/0123928 A1 | 5/2018 | Moradi et al. | |
| 2018/0152369 A1* | 5/2018 | McCallen | H04L 43/106 |
| 2018/0167294 A1* | 6/2018 | Gupta | H04L 43/50 |
| 2020/0310846 A1 | 10/2020 | Moradi et al. | |

OTHER PUBLICATIONS

Croce et al., "Large-Scale Available Bandwidth Measurements: Interference in Current Techniques," IEEE Transactions on Network and Service Management, vol. 8, No. 4, Dec. 2011, pp. 361-374.
Duche et al., "Round Trip Delay Time as a Linear Function of Distance Between the Sensor Nodes in Wireless Sensor Network", International Journal of Engineering Sciences & Emerging Technologies, vol. 1, Issue 2, Feb. 2012, pp. 20-26.
Felter et al., "An Updated Performance Comparison of Virtual Machines and Linux Containers," IEEE, 2015, pp. 171-172.
Gangam et al., "Mitigating Interference in a Network Measurement Service", 2011 IEEE Nineteenth IEEE International Workshop on Quality of Service, IEEE, 2011, pp. 1-9.
Guo et al., "Pingmesh: A Large-Scale System for Data Center Network Latency Measurement and Analysis," SIGCOMM'15, Aug. 17-21, 2015, pp. 139-152.
Huang et al., "Measurement-Aware Monitor Placement and Routing: A Joint Optimization Approach for Network-Nide Measurements," IEEE Transactions on Network and Service Management, vol. 9, No. 1, Mar. 2012, pp. 48-59.
International Preliminary Report on Patentability received for PCT Patent Application No. PCT/SE2016/050430, dated Nov. 22, 2018, 9 pages.
International Preliminary Report on Patentability received for PCT Patent Application No. PCT/SE2016/051319, dated Jul. 11, 2019, 8 pages.
International Search Report and Written Opinion for Application No. PCT/SE2016/050430, dated Sep. 22, 2016, 11 pages.
International Search Report and Written Opinion received for PCT Patent Application No. PCT/SE2016/051319, dated Oct. 10, 2017, 9 pages.
International Search Report and Written Opinion, PCT App. No. PCT/EP2017/071355, dated May 15, 2018, 10 pages.
Postel, J., "Internet Control Message Protocol, Darpa Internet Program Protocol Specification", Network Working Group, Request for Comments: 792, Sep. 1981, pp. 1-21.
RFC 5357: Hedayat et al., "A Two-Way Active Measurement Protocol (TWAMP)," Network Working Group, Request for Comments: 5357, Oct. 2008, 26 pages.
Schuss et al., "A Competition to Push the Dependability of Low-Power Wireless Protocols to the Edge", EWSN '17: Proceedings of the 2017 International Conference on Embedded Wireless Systems and Networks, 2017, 12 pages.
Tillenius et al., "Resource-Aware Task Scheduling", ACM Transactions on Embedded Computing Systems, vol. 14, No. 1, Article 5, Jan. 2015, 25 pages.
Wennerstrom et al., "A Long-Term Study of Correlations between Meteorological Conditions and 802.15.4 Link Performance", 2013 IEEE International Conference on Sensing, Communications and Networking (SECON), IEEE, 2013, pp. 221-229.
Wolosz et al., "A measurement study of predicting throughput from LQI and RSSI", Computer Sciences, Dependable Communication and Computation Systems, 2012, 12 pages.
Xia et al., "Resource Optimization for Service Chain Monitoring in Software-Defined Networks," Fourth European Workshop on Software Defined Networks, 2015, pp. 91-96.
Yu et al., "Distributed and Collaborative Traffic Monitoring in Software Defined Networks," HotSDN'14, Aug. 22, 2014, 6 pages.
Zhang et al., "HELM: Conflict-Free Active Measurement Scheduling for Shared Network Resource Management", 2015 IFIP/IEEE International Symposium on Integrated Network Management (IM), May 2015, 9 pages.
Non-Final Office Action, U.S. Appl. No. 16/472,180, dated Feb. 23, 2021, 12 pages.
Communication pursuant to Article 94(3) EPC for EP Application No. 16728417.3, dated Apr. 14, 2020, 5 pages.
ETSI GS NFV 003 V1.1.1, "Network Functions Virtualisation (NFV); Terminology for Main Concepts in NFV," Oct. 2013, 10 pages, European Telecommunications Standards Institute.
Non Final Office Action, U.S. Appl. No. 16/300,530, dated Nov. 4, 2020, 19 pages.

(56) References Cited

OTHER PUBLICATIONS

Communication pursuant to Article 94(3) EPC, EP App. No. 16728417.3, dated Mar. 2, 2021, 5 pages.
International Preliminary Report on Patentability, PCT App. No. PCT/EP2017/071355, dated Mar. 5, 2020, 9 pages.
Final Office Action, U.S. Appl. No. 16/300,530, dated Mar. 17, 2021, 19 pages.
Final Office Action, U.S. Appl. No. 16/472,180, dated Apr. 13, 2021, 12 pages.
Intention to Grant, EP App. No. 17758856.3, dated Apr. 13, 2021, 5 pages.

\* cited by examiner

DETERMINE, BASED ON THE CURRENT VALUE OF THE PARAMETER AND THE MEASUREMENT MODEL, A CURRENT ESTIMATION OF THE MEASUREMENT FOR THE WIRELESS DEVICE
335

WHERE THE CURRENT ESTIMATION OF THE MEASUREMENT INCLUDES A LOSS PROBABILITY INDICATING A PROBABILITY WITH WHICH THE MEASUREMENT PACKET IS TO BE LOST AT THE WIRELESS DEVICE
405

WHERE THE CURRENT ESTIMATION OF THE MEASUREMENT INCLUDES AN ESTIMATION OF A ROUND TRIP TIME (RTT) BETWEEN THE FIRST NETWORK DEVICE AND THE WIRELESS DEVICE
410

Figure 4

METHOD AND APPARATUS FOR ENABLING ACTIVE MEASUREMENTS IN INTERNET OF THINGS (IOT) SYSTEMS

CROSS-REFERENCE TO RELATED APPLICATIONS

This application is a National stage of International Application No. PCT/EP2017/071355, filed Aug. 24, 2017, which is hereby incorporated by reference.

TECHNICAL FIELD

Embodiments of the invention relate to the field of computer networking; and more specifically, to enabling active measurement in IoT systems.

BACKGROUND

Internet of Things (IoT) is an emerging technology that provides expanding opportunities in areas such as health care, industry, and smart homes. IoT technology can be seen as the inter-networking of physical devices, wireless sensing devices (WSDs), vehicles, buildings, factories, and other items. The items forming the IoT system can be referred to as IoT devices. The IoT devices can be equipped with sensors and/or actuators. Most often, the IoT devices are also connected to a traditional backbone network via a wireless gateway.

Network performance observability is a measure of how well internal states of a network system can be determined by analyzing external outputs. In an IoT system, the state describing network performance is highly complex and dynamic due to interactions between and also within the main components of the system. To make IoT systems robust and reliable many challenges are still only partly addressed, such as network performance observability.

A use case for network performance observability is to monitor the network performance in general but also to find and localize performance bottlenecks, which enables timely mitigation actions that can lower costs for both operators and consumers. Another use case is to use the observed performance as a basis for further deployment of devices. For example, in an IoT system including wireless sensing devices, the observed performance of the system is used to determine where to deploy WSDs to minimize disturbance and ensure low latency and high throughput.

Several techniques can be used to determine network performance in traditional network infrastructure. For example, active measurement techniques are used for assessing performance of packet-switched networks. The metrics measured by active measurement techniques include availability, one-way delay, round-trip time (RTT), delay variation, and loss. Combining multiple measurements between different nodes allows to find and localize bottlenecks. In active measurement techniques probe packets are bounced between senders/controllers and reflectors. Time stamps are generated either when the transmit and receive events occur on both sides, i.e., on the sender and the reflector sides, or alternatively, time stamps are generated only at the sender side. For example, in IP networks, the Internet Engineering Task Force (IETF) Request for Comment (RFC) 5357 describes a The Two-Way Active Management Protocol (TWAMP), that provides a two-way or round trip active measurement where time stamps are generated both at the sender and the reflector sides. IETF Internet Control Message Protocol (ICMP), described in RFC 792, provide an active measurement technique where timestamps are generated at the sender side only. Ethernet and Multiprotocol Label Switching (MPLS) networks have other versions of active measurement protocols based on International Telecommunication Union (ITU)-T Y.1730.

Today, performance observability in IoT systems, in particular the wireless network, is dependent on the capabilities of the wireless devices that are part of the wireless network and is dependent on the wireless medium. Different performance parameters are available, and in some cases identical parameters are defined differently depending on the underlying hardware.

Attempting the deployment of traditional network performance observability techniques in IoT systems raises several challenges. For example, wireless networks that rely on a gateway device to connect to the backbone network, may have different interfaces for retrieving the performance data, and thus the management system needs to implement a separate calling interface for each type of sensor network. This adds complexity and cost to the operator of the network.

Active measurements are by definition intrusive and are typically added to existing business-critical services. Adding these measurements techniques may have a significant footprint on the system, in particular for IoT system. For example, measurement techniques have an effect on the system performance, in terms of energy consumption, CPU usage, code size, and network overhead. In addition, IoT devices may be limited in terms of capabilities (e.g., memory size, processing power, etc.), which affects the active measurement results.

SUMMARY

One general aspect includes a method in a first network device of enabling active measurement in a network path between a second network device acting as a controller of a network performance observability protocol and a wireless device, where the first network device is located between the second network device and the wireless device, the method including: capturing a measurement packet from the second network device; determining a destination of the measurement packet, where the destination of the measurement packet is the wireless device; determining a measurement model associated with the destination, where the measurement model represents a correspondence between one or more parameters related to the wireless device and estimated values of a measurement for the wireless device; determining a current value of a parameter related to the wireless device; determining, based on the current value of the parameter and the measurement model, a current estimation of the measurement for the wireless device; and responding to the measurement packet based on the current estimation of the measurement while avoiding to transmit the measurement packet to the wireless device.

One general aspect includes a first network device for enabling active measurement in a network path between a second network device acting as a controller of a network performance observability protocol and a wireless device, where the first network device is located between the second network device and the wireless device, the first network device including: a non-transitory computer readable medium to store instructions; and a processor coupled with the non-transitory computer readable medium to process the stored instructions to capture a measurement packet from the second network device; determine a destination of the measurement packet, where the destination of the measurement packet is the wireless device; determine a measurement model associated with the destination, where the measurement model represents a correspondence between one or more parameters related to the wireless device and estimated values of a measurement for the wireless device; determine a current value of a parameter related to the wireless device; determine, based on the current value of the parameter and the measurement model, a current estimation of the measurement for the wireless device; and respond to the measurement packet based on the current estimation of the measurement while avoiding to transmit the measurement packet to the wireless device.

A computer program comprising program instructions, the computer program being loadable into a data-processing unit adapted to cause execution of the following operations, when the computer program is run by the data-processing unit, capturing a measurement packet from a second network device; determining a destination of the measurement packet, where the destination of the measurement packet is a wireless device; determining a measurement model associated with the destination, where the measurement model represents a correspondence between one or more parameters related to the wireless device and estimated values of a measurement for the wireless device; determining a current value of a parameter related to the wireless device; determining, based on the current value of the parameter and the measurement model, a current estimation of the measurement for the wireless device; and responding to the measurement packet based on the current estimation of the measurement while avoiding to transmit the measurement packet to the wireless device.

A non-transitory computer readable storage medium that provide instructions, which when executed by a processor of a first network device, cause said processor to enable active measurement in a network path between a second network device acting as a controller of a network performance observability protocol and a wireless device, wherein the first network device is located between the second network device and the wireless device, by performing operations of capturing a measurement packet from a second network device; determining a destination of the measurement packet, where the destination of the measurement packet is a wireless device; determining a measurement model associated with the destination, where the measurement model represents a correspondence between one or more parameters related to the wireless device and estimated values of a measurement for the wireless device; determining a current value of a parameter related to the wireless device; determining, based on the current value of the parameter and the measurement model, a current estimation of the measurement for the wireless device; and responding to the measurement packet based on the current estimation of the measurement while avoiding to transmit the measurement packet to the wireless device.

BRIEF DESCRIPTION OF THE DRAWINGS

The invention may best be understood by referring to the following description and accompanying drawings that are used to illustrate embodiments of the invention. In the drawings:

FIG. 4 illustrates a flow diagram of exemplary operation that can be performed for determining the current estimation of the measurement for the WD, in accordance with some embodiments.

DETAILED DESCRIPTION

Figure 1:
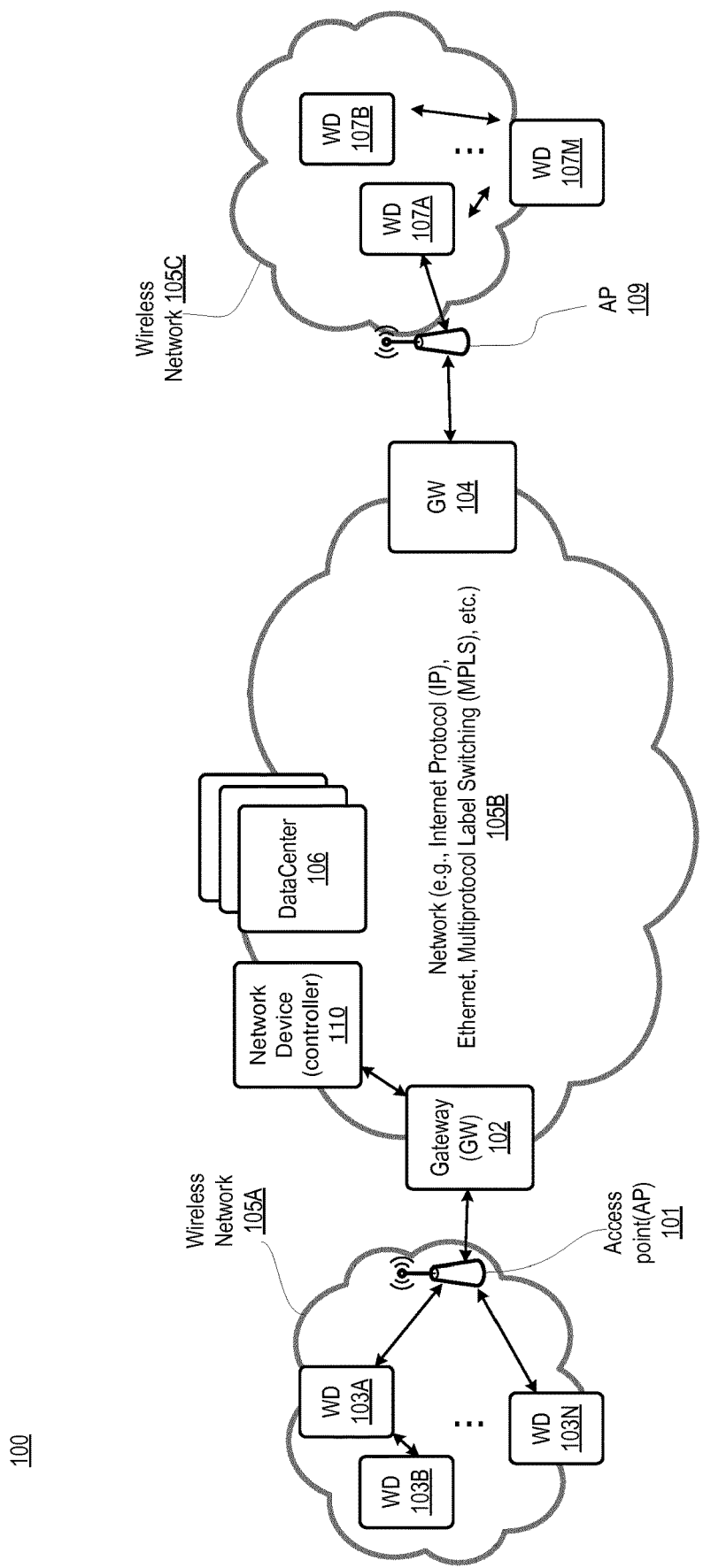
FIG. 1 illustrates a block diagram of an exemplary Internet-of-Things (IoT) system, in accordance with some embodiments.

The following description describes methods and apparatus for enabling active measurements in IoT systems. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

This invention proposes a function in a network device which captures active measurement packets from a controller with reflector destination in a wireless network. Instead of forwarding the measurement packets to the reflector, the network device determines an estimated measurement metric using a measurement model built for the reflector. The network device responds to the measurement packet based on the estimated measurement without transmitting the packet to the reflector.

The embodiments described herein provide methods and systems for enabling resource-aware active measurements in IoT systems. In one embodiment, a first network device enables active measurement in a network path between a second network device acting as a controller of a network performance observability protocol and a wireless device. The first network device is located between the second network device and the wireless device. The first network device captures a measurement packet from the second network device; determines a destination of the measurement packet, where the destination of the measurement packet is the wireless device; and determines a measurement model associated with the destination. The measurement model represents a correspondence between one or more parameters related to the wireless device and estimated values of a measurement for the wireless device. The first network device determines a current value of a parameter related to the wireless device; determines, based on the current value of the parameter and the measurement model, a current estimation of the measurement for the wireless device; and responds to the measurement packet based on the current estimation of the measurement while avoiding to transmit the measurement packet to the wireless device.

The embodiments described herein provide several advantages when compared with existing active measurement techniques. As will be described in further details below, the invention described herein enable low energy consumption of the IoT devices in the wireless networks (WNs). A network device, e.g., an IoT device, acting as a reflector with respect to a measurement protocol in the WN does not need to receive measurement packets, construct measurement reply packets, and transmit the reply packets. Further, if the WN includes multiple hops, each forwarding network device can avoid performing this activity. Thus, the embodiments of the present invention minimize the energy consumption and also lower the network overhead in the WN. In many deployment scenarios, WNs may have limited transmission capacity and the present invention lowers the amount of administrative traffic, such as active measurement packets needed in the WN. In addition, the present invention provides a uniform interface for observing wireless network performance, which reduces the number of gateway interfaces that the monitoring system needs to implement.

Throughout the following description similar reference numerals have been used to denote similar elements such as components, features of a system and/or operations performed in a system or element of the system, when applicable.

FIG. 1 illustrates a block diagram of an exemplary Internet-of-Things (IoT) system, in accordance with some embodiments. The IoT system 100 includes a first wireless network 105A, a second wireless network 105C, and a network 105B. A wireless network (e.g., 105A and 105C) includes spatially distributed autonomous wireless devices (WD). In some embodiments, the wireless devices can be wireless sensing devices (WSDs) or actuators. For example, WDs 103A-N and WDs 107A-N are part of wireless network 105A and 105C respectively. Each WD is operative to monitor physical or environmental conditions, (such as temperature, humidity, pressure, movement, etc.) and/or to act upon the environment (i.e., the WD is an actuator). In some embodiments, the WDs are operative to record data about physical events and to deliver the data through the network 105B. In some embodiments, the recorded data is transmitted through the network 105B to be stored in a data center and/or transmitted to one or more users in other networks coupled with the network 105B. Today such networks are used in many industrial and consumer applications, such as industrial process monitoring and control, machine health monitoring, smart homes application, retail applications, etc.

The WDs 103A-N and 107A-M are electronic devices. A wireless device can be a small electronic device that is attachable to an object. A WD can include one or more sensors for detecting physical events (e.g., temperature, humidity, barometric pressure, CO2 concentration, acceleration, pressure, sound, movement, etc.) and recording sensor measurements in response to the detection of these physical events. When the WD includes one or more sensors, it may be referred to as a wireless sensing device (WSD). A WSD can store the sensor measurements related to physical events detected over a period of time. The WSDs may record sensor measurements at regular intervals of time. In some embodiments the WDs may include on or more actuators for acting on the environment (e.g., a component of a machine that is responsible for moving or controlling a mechanism or system, for example by actuating (opening or closing) a valve, a door, a light, etc.). In some embodiments a WD can include at least one sensor and at least one actuator. The WDs are operative to be coupled to one or more gateway devices (e.g., gateway device 102 and 104) and transfer network traffic to the gateway devices. In some embodiments, the WDs can connect to the gateway device through an access point, e.g., AP 101 or AP 109. In other embodiments, the AP may be part of the gateway device.

The gateway devices 102/104 are electronic devices situated between the WDs and the data center 106. The gateway devices 102/104 are part of a network 105B that couples one or more wireless networks with a data center 106 and/or to user devices (that are not illustrated). The gateway device 102/104 connects to the WDs and offloads sensor measurements and/or transmit control data for operating an actuator. Although only three WDs are illustrated for each wireless network, the gateway device 102/104 is operative to connect with more than three wireless devices. Typically, the gateway device 102/104 will be connected in an intermittent manner with tens (hundreds, or more) of wireless devices.

The network 105B can be a Layer 2 or Layer 3 network. For example, the network 105B is an Internet Protocol (IP) network, an Ethernet network, a Multiprotocol Label Switching (MPLS) network, etc. The data center 106 includes one or more cloud based network devices operative to receive from one or more wireless devices (e.g., the WD 103A) data through one or more gateway devices (e.g., the gateway device 102). The data can be stored in a database and may be transmitted to an end user device. The network 105B further includes a network device 110 that acts as a controller operative to transmit and receive measurements packets for enabling active measurement of the data paths between the ND 110 and the WDs. While the ND 110 is illustrated as being a separate network device, one of ordinary skill in the art would understand that this is intended to be exemplary only. In some embodiments, the ND 110 may be included in the data center 106, or as part of an administrative server operative to maintain and control the operations of the networks 105A-C. In other embodiments, the ND 110 may include functionalities in addition to the operations performed by the controller without departing from the scope of the present invention.

In some embodiments, the gateway device 102 is operative to enable model-based active measurement techniques. As will be described in further details below, the gateway device is operative to capture active measurement packets received from the controller in ND 110, where the reflector destination of the measurements packets is a WD, for example WD 103A. Instead of forwarding the measurement packet to the WD 103A, the gateway device 102 determines based on an associated model an estimated measurement response. In some embodiments, the measurement response can cause the measurement packet to be labeled as a lost packet indicating that the packet would have been lost if received at the WD 103A. In other embodiments, the measurement response includes an estimation of a round-trip time between the WD 103A and the gateway device 102. In other embodiments, the measurement response may include an estimation of other types of measurements indicating the one or more states of the associated with WD 103A within the network, without departing from the scope of the present invention. The measurement response is then transmitted to the controller as if it originated from the WD 103A. Thus, the gateway device 102 acts on behalf of the WD 103A by providing an estimation of measurements that reflects the current state of the WD 103A while avoiding an overload of the bandwidth and processing capacities at the WD 103A.

Figure 2:
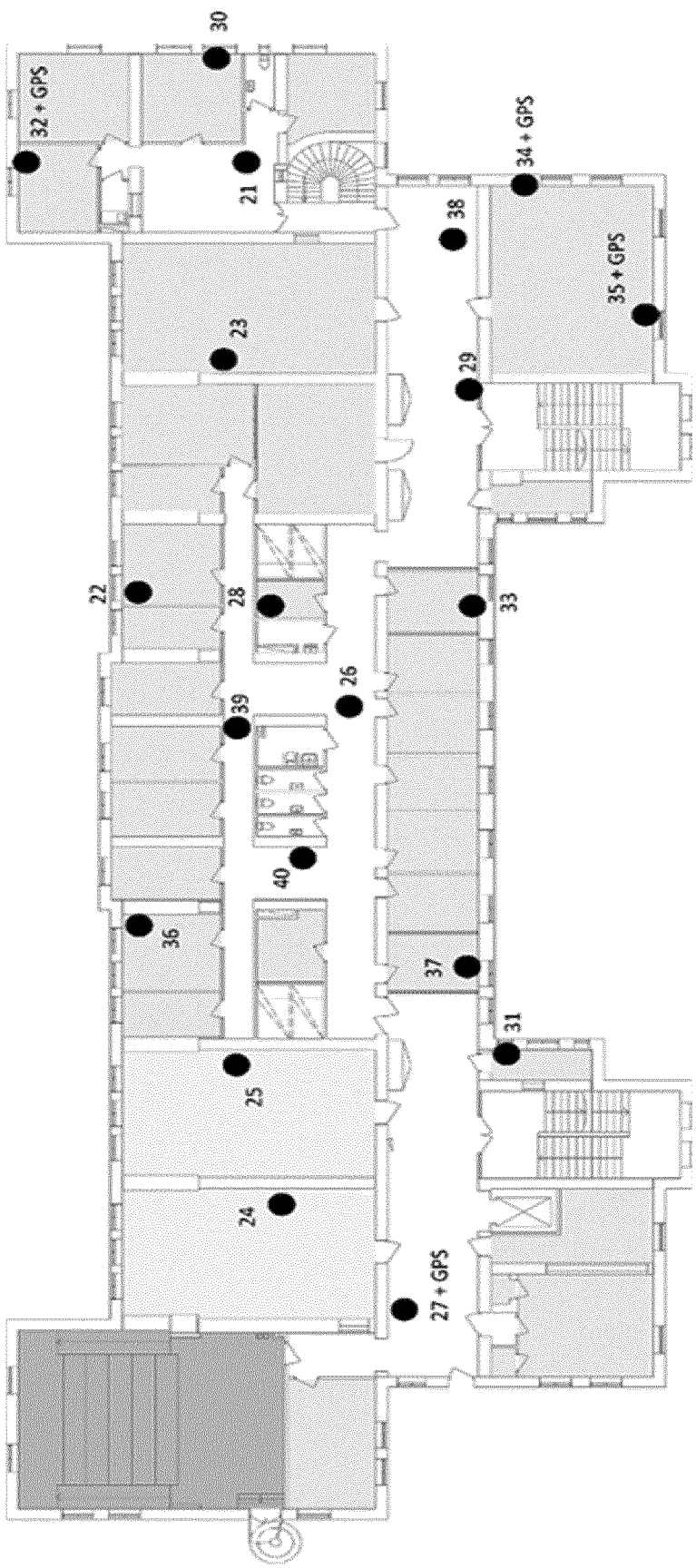
FIG. 2 illustrates a block diagram of an exemplary deployment of WDs forming a wireless network part of an IoT system in accordance with some embodiments.

FIG. 2 illustrates a block diagram of an exemplary deployment of WDs forming a wireless network part of an IoT system in accordance with some embodiments. The wireless network 205 may be for example wireless network 105A or wireless network 105C. The wireless network 205 includes multiple wireless devices WD 21 to WD 40. Some of the network devices may have different functionalities. In some embodiments, at least a subset of these WDs are WSDs recording sensing measurements and transmitting the sensing measurements to a backbone network through a gateway device. In addition, some of the WDs have a global positioning system (GPS), e.g., WDs 27, 32, 34 and 35. In some embodiments, one of the WDs may act as a gateway device for connecting the other WDs to a controller, for example ND 34. In other embodiments, the gateway device may be located remotely from the WDs 21-40 and is coupled to the WDs through a wireless access point. The wireless network 205 may be located in a public or private location and used for monitoring the location by recording one or more physical events that occur (e.g., temperature, humidity, sound, air pressure, movement, etc.).

The operations in the flow diagrams below will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
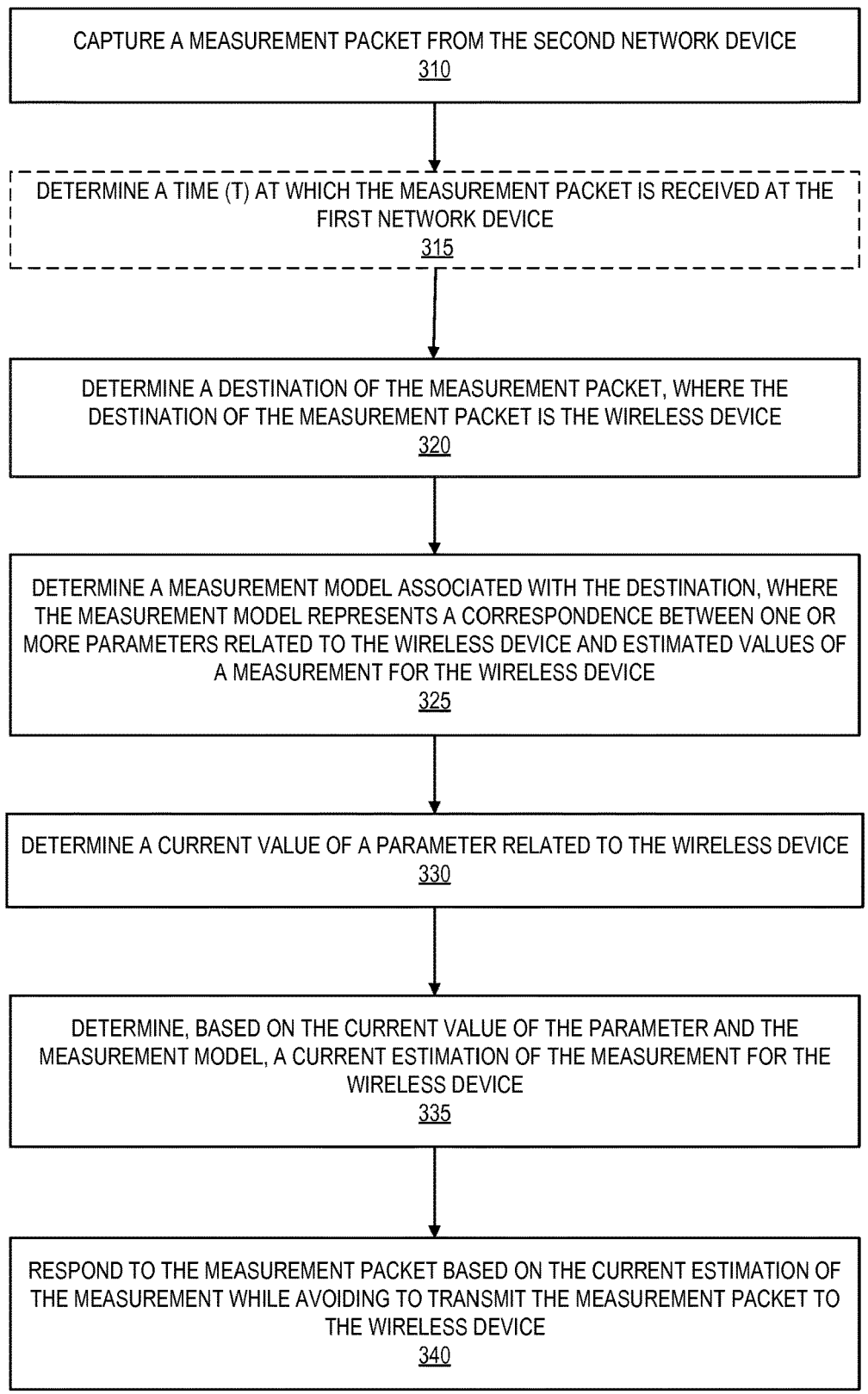
FIG. 3 illustrates a flow diagram of exemplary operations for enabling active measurement in IoT systems, in accordance with some embodiments.

FIG. 3 illustrates a flow diagram of exemplary operations for enabling active measurement in IoT systems, in accordance with some embodiments. ND 110, which includes a controller and will be referred to herein as controller 110, transmits a measurement packet to the gateway device 102. The measurement packet is destined to one of the WDs 103A-N coupled with the gateway device 102, e.g., WD 103A. The measurement packet is a measurement probe as defined with respect to an active measurement protocol where measurement probes are transmitted from a controller to a reflectors and reflected back from the reflectors to the controller. Several measurement protocols can be used without departing from the scope of the present invention. For example, TWAMP, TWAMP Light, ICMP in IP networks or corresponding protocols in Ethernet and MPLS networks. In the following description TWAMP will be used as an exemplary active measurement protocol, however this is intended to be exemplary only and should not be regarded as limitative. Other active measurement protocols can be used without departing from the scope of the present invention. The measurement packet is intended to enable the controller to determine, as part of the active measurement protocol, a measurement of performance or availability, such as an Round-trip-time between the controller and the WD, whether a packet loss occurs or not at the WD, or other types of measurements related to the state of the WD within the network.

At operation 310, the gateway device 102 captures the measurement packet received from the controller 110. In some embodiments, the gateway device 102 determines, at operation 315, a time (T) at which the measurement packet is received at the gateway device 102. In some embodiments, this step may be skipped. Flow then moves to operation 320 at which the gateway device 102 determines a destination of the measurement packet. The destination of the measurement packet is the wireless device WD 103A. In some embodiments, the destination may be determined based on the destination address of the measurement packet, such as an IPv4 or an IPv6 address, an MPLS label, or a media access control (MAC) address. In other embodiments, the destination may be defined by a coordinate, an area that is defined based on the packet's destination address. In some embodiments, the measurement packet may include additional information, e.g., GPS coordinate that identify the destination of the measurement packet.

Flow then moves to operation 325, at which the gateway device 102 determines a measurement model associated with the destination. The measurement model M represents a correspondence between one or more parameters ($X_i$) related to the wireless device WD 103A and estimated values of a measurement (Y) for the wireless device. The correspondence between the parameters and the measurement can be represented as M: $X_i \rightarrow Y$. The parameters $X_i$ includes a set of one or more indicators related to the state of operations of the WD 103A. For example, the parameters can be one or more of radio performance indicators such as the relative received signal strength (RSSI), the link quality indicator (LQI); temperature recorded by the WD 103A or any other sensor measurement recorded by the WD 103A; the distance of the WD 103A from the gateway device 102; coordinates of the WD 103A; or general network load, etc. In some embodiments, the parameter can include an identifier uniquely identifying the gateway device (e.g., an IP address of the gateway device). In some embodiments, the parameter can include an identifier uniquely identifying the wireless network (e.g., wireless network 105A).

In some embodiments, the measurement can correspond to an estimated round-trip time, RTT, between the gateway and the WD 103A. This estimated RTT is not to be confused with RTT for the whole measurement packet originating from the controller 110, which can be greater than the estimated RTT between the gateway device 102 and the WD 103A. The global RTT that is to be evaluated between the controller 110 and the WD 103A includes the actual RTT between the gateway device 102 and the controller 110 and an estimation, based on the model $M_{RTT}$, between the gateway device 102 and the WD 103A.

In some embodiments, the measurement can correspond to a probability of loss of the received measurement packet. The probability of loss indicates a probability with which the measurement packet were to be lost at the wireless device if the measurement packet were to be received at the wireless device. Thus, the probability of loss is an estimation of the likelihood of packet being dropped or lost at the WD 103A if the gateway device 102 had transmitted the packet to the WD 103A instead of capturing it. This probability Y is determined based on the model $M_{loss}$: $X_i \rightarrow Y$.

In some embodiments, determining a measurement model includes determining at least one of a loss model $M_{loss}$ and a RTT model $M_{RTT}$. Different embodiments can be contemplated, embodiments, where only one type of model is determined depending on what type of measurement is desired, and embodiments where both types of models are determined such that both a probability of loss and an RTT are estimated for a given WD 103A.

In some embodiments, the model M is associated with the WD 103A such as it can be used to predict the measurements for this WD only. In other embodiments, the model can be associated with multiple ones of the WD 103A-N such as it can be used to predict the measurements for this set of WD 103A-N. Thus, determining the model at operation 325 includes determining the model that is associated with the WD 103A, when this model can be uniquely associated with the WD 103A or alternatively with multiple ones of the WD 103A-N. A model can be associated with all the WDs 103A-N from the network 105A or with a subset that is strictly less that all the WDs 103A-N.

In some embodiments, the models $M_{loss}$ and $M_{RTT}$ are determined based on machine learning techniques by observing at least one of measurement packets and traffic packets transmitted between the wireless device and the first network device and observing values of one or more parameters related to the wireless device. The models enable the estimation of measurements based on current parameters of the system, for example current values of RSSI, LQI, distance, location, temperature, and any other parameter that was used for building the model. The models are built using statistical learning techniques.

The models are built based on real measurements of the WD 103A during a learning phase. In one embodiment, the real measurements are obtained by enabling the active measurement protocol in the WDs 103A-N and allowing measurement packets to be forwarded to the WD 103A-N. The measurements are performed by establishing measurement session(s) between the gateway device 102 and one or more of the WD 103A-N. The results of the measurements are stored to be further processed and to generate the different models, $M_{loss}$ and $M_{RTT}$. For example, for each measurement session, the measured RTT towards each WD 103A-N is recorded along with the associated environment parameters of the WD (e.g. GPS coordinates, distance, humidity, temperature, RSSI, LQI, network traffic, etc.). The measurement sessions can be carried out as part of the network deployment procedure.

In another embodiment the measurements are obtained by observing and time stamping service traffic when sent to and received from the WD 103A-N. In some embodiments, this can be performed by using a traffic sniffer. The traffic sniffer can be implemented in the gateway device 102 or in another network device that can intercept and log network traffic forwarded from the gateway device 102 to the WDs or from the WDs to the gateway device 102. In some embodiments, the measurements can be stored at the gateway device 102 or in another network device coupled with the gateway device 102.

Once the measurements are obtained one or several measurement models are built, for example using Random Forests techniques. The models can be built by the gateway device 102 or by another network device that has access to the recorded measurements without departing from the scope of the present invention. In some embodiments, the models are stored in a database and determining the model may include performing a look up in the database based on an identification of the WD 103A to obtain the associated model(s).

The models can be updated from time to time to reflect changes in the environment. For example the measurement model updates can depend on the amount of variation that can occur in the targeted measurements such as RTT and loss. For example, if measurements towards a particular WD is determined to be stable, then model updates can be kept scarce in time. In contrast, when it is determined that there is a significant variation between the measurements, the frequency of model updates can be increased.

Figure 6A:
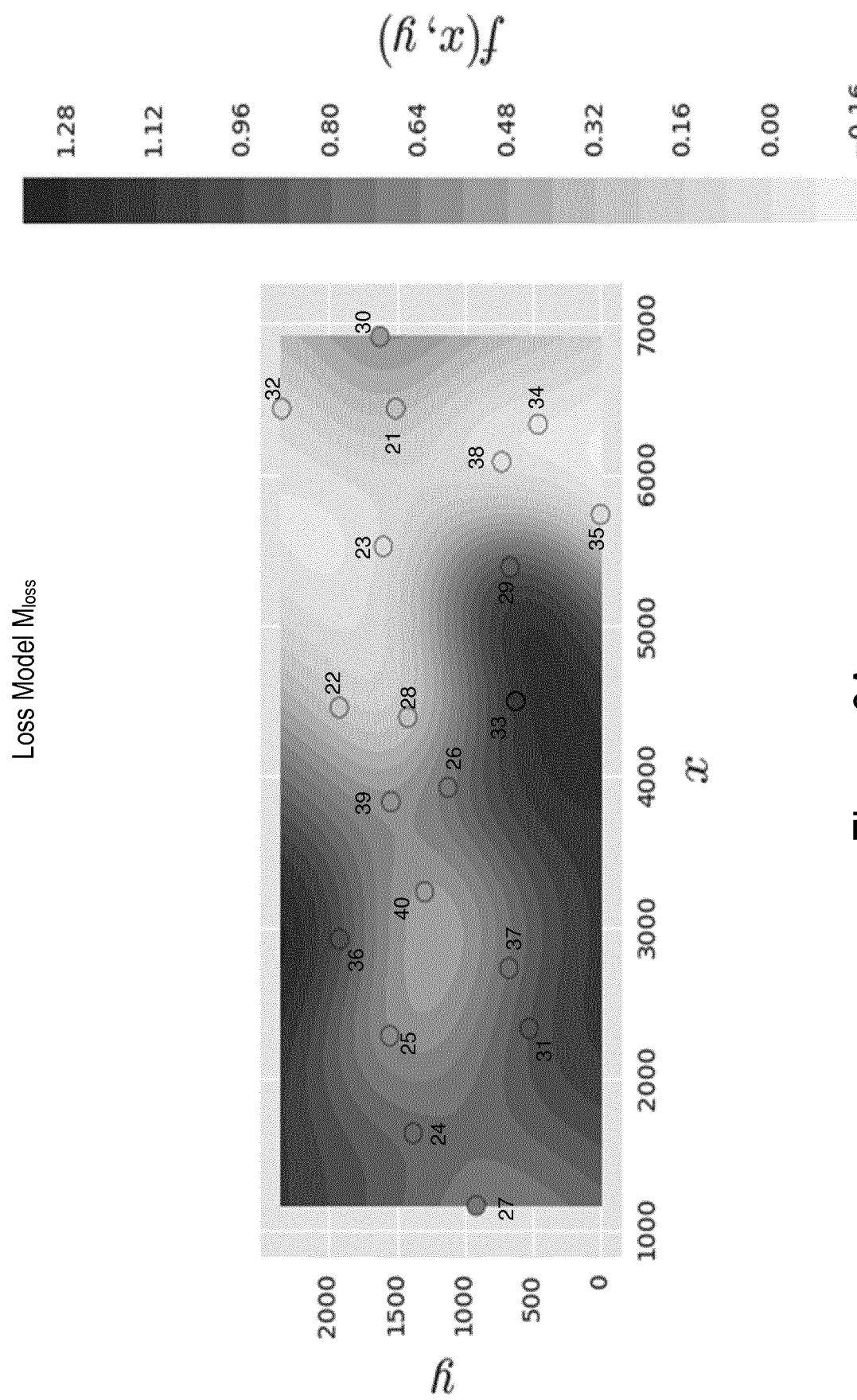
FIG. 6A illustrates an exemplary loss model $M_{loss}$ for estimating a probability of packet loss in a WD, in accordance with one embodiment.
Figure 6B:
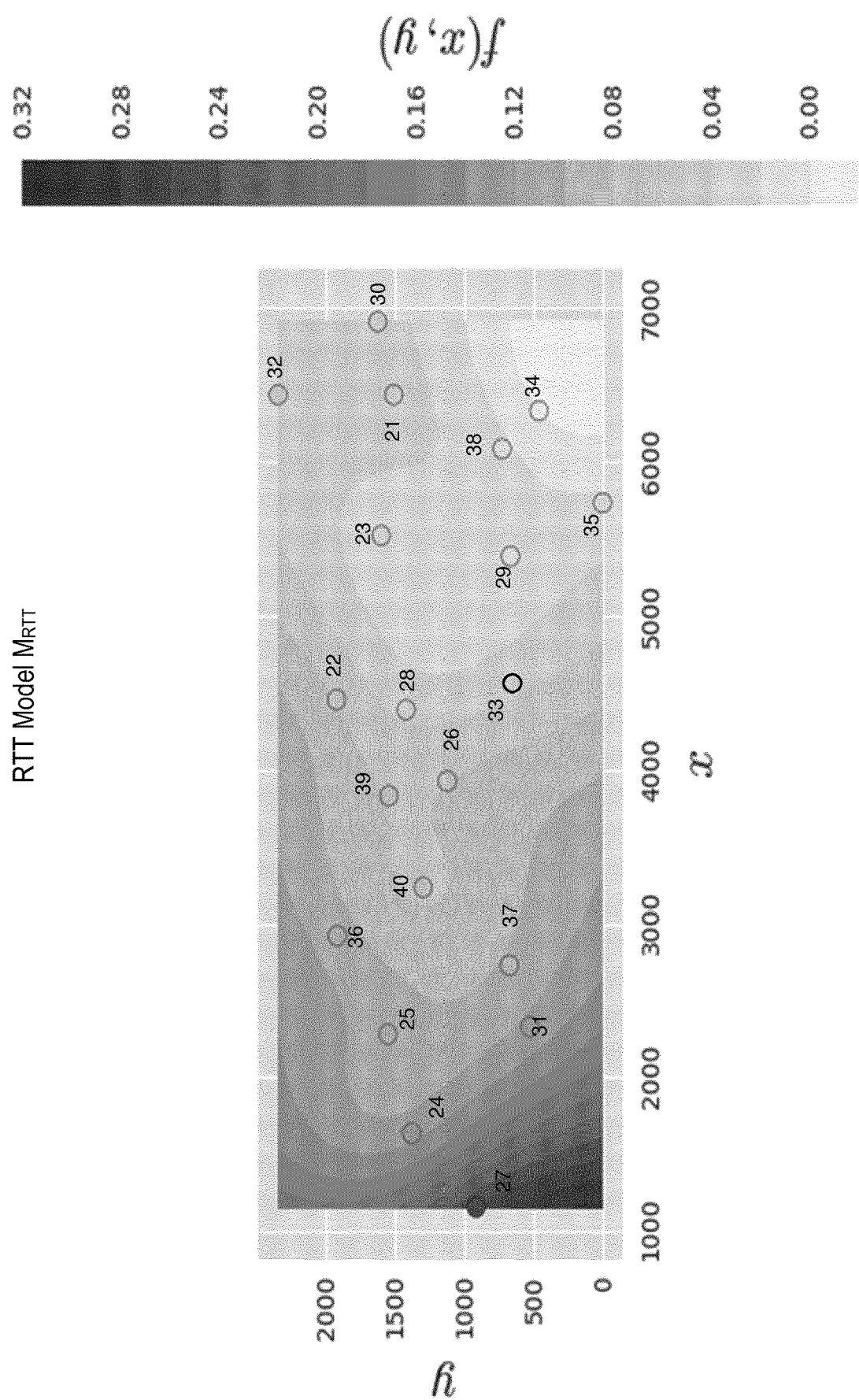
FIG. 6B illustrates an exemplary RTT model $M_{RTT}$ for estimating the RTT from a gateway device to other NDs of a wireless network, in accordance with one embodiment.

FIG. 6A, and FIG. 6B illustrate examples of measurement model in accordance with some embodiments. The measurement models $M_{loss}$ and $M_{RTT}$ are built for the wireless network 205 of FIG. 2. In this non-limiting example, the wireless devices 21-40 communicate over IP, e.g., IPv6, that can be enabled by IETF 6LowPAN, running on top of IEEE 802.15.4. These protocols enable the transmission of IPv6 traffic and the use of active measurement protocol over the network 205. As a non-limiting example, TWAMP Light, as defined in IETF RFC 5357, can be used for enabling active measurements from a controller towards the reflectors. In this example, the reflectors are the WDs 21-33, and WDs 35-40, WD 34 acting as a gateway device coupling the controller (not illustrated in FIG. 2) and the other WDs from the wireless network 205.

FIG. 6A illustrates an exemplary loss model $M_{loss}$ built to represent the probability of loss f(x,y) based on the coordinates of a WD in a coordinate system (x,y) representing the network 205. In some embodiments, the model $M_{loss}$ may take into account several other parameters in addition to the coordinates of a network device to determine the probability of loss, such as the distance between the WD and the gateway device 34, LQI, and RSSI.

FIG. 6B illustrates an exemplary RTT model $M_{RTT}$ for estimating the RTT from ND 34 to all other NDs of the network 205, in accordance with one embodiment. $M_{RTT}$ is built to represent the median RTT f(x,y) between the WD 34 and each one of the other WDs of the network 205, based on the coordinates of a WD in a coordinate system (x,y) representing the network 205. In some embodiments, the model $M_{RTT}$ may take into account several other parameters in addition to the coordinates of a network device to determine the median RTT, such as the distance between the WD and the gateway device 34, LQI, and RSSI.

The two models, $M_{RTT}$ and $M_{loss}$, are general models where a single model of each type is used for all WDs of the wireless network 205. These models are built based on real measurements received from all the WDs that form the wireless network 205. In other embodiments, a single model can be built for each network device. In this case, each model is built based on real measurements received only for that wireless device. The models may be built with a random forest estimator.

Referring back to FIG. 3, the flow of operations moves from operation 325 to operations 330. At operation 330, the gateway device 102 determines a current value of a parameter related to the wireless device. The current value of the parameter represents a value of the parameter associated with the time T at which the measurement packet has been received at the gateway device 102. In some embodiments, the current value of the parameter represents the latest state of the WD 103A that is known to the gateway device 102. For example, the current value of the parameter may be the latest value of a radio metric (RSSI, LQI) recorded for the WD 103A, the latest coordinates of the WD 103A, the distance between the gateway device and the WD 103A, the latest temperature, or any other sensor measurement recorded for the WD 103A. The values of the parameters can be received through normal traffic from the WD 103A and recorded at the gateway device. In some embodiments, the values of the latest coordinates may be retrieved from a stored map including the coordinates of all the WDs. Upon receipt of the measurement packet, the gateway device 102 determines the current value of the parameter. Flow then moves to operation 335, at which the gateway device 102 determines, based on the current value of the parameter and the measurement model, a current estimation of the measurement for the wireless device.

FIG. 4 illustrates a flow diagram of exemplary operations that can be performed for determining the current estimation of the measurement for the WD, in accordance with some embodiments. In one embodiment (operation 405), the current estimation of the measurement includes a loss probability indicating a probability with which the measurement packet is to be lost. The loss probability is an estimation of the likelihood that the measurement packet would have been lost if it was sent to the WD. For example, the gateway device 102 determines an estimated probability of loss for the WD 103A based on the $M_{loss}$ and the current value of a parameter that were determined. In another embodiment (operation 410), the current estimation of the measurement includes an estimation of an RTT between the first network device and the wireless device. For example, the gateway device 102 determines an estimated RTT value for the WD 103A based on the $M_{RTT}$ and the current value of a parameter that were determined. The current value of the parameter can be the current position of the WD 103A, a current temperature recorded by the WD 103A, traffic load of the WD 103A, the RSSI, or the LQI recorded for WD 103A, or a combination of two or more of these values.

Flow moves to operation 340, at which the gateway device 102 responds to the measurement packet based on the current estimation of the measurement while avoiding to transmit the measurement packet to the wireless device. Thus, as opposed to existing active measurement techniques where a measurement packet needs to be transmitted to the WD 103A in order to obtain the measurement, the present techniques determine an estimation of the measurement from the gateway device 102 to the WD 103A, based on the measurement model without transmitting the packet to the WD 103A, consequently saving bandwidth, storage and processing capacities at the WD 103A.

Figure 5A:
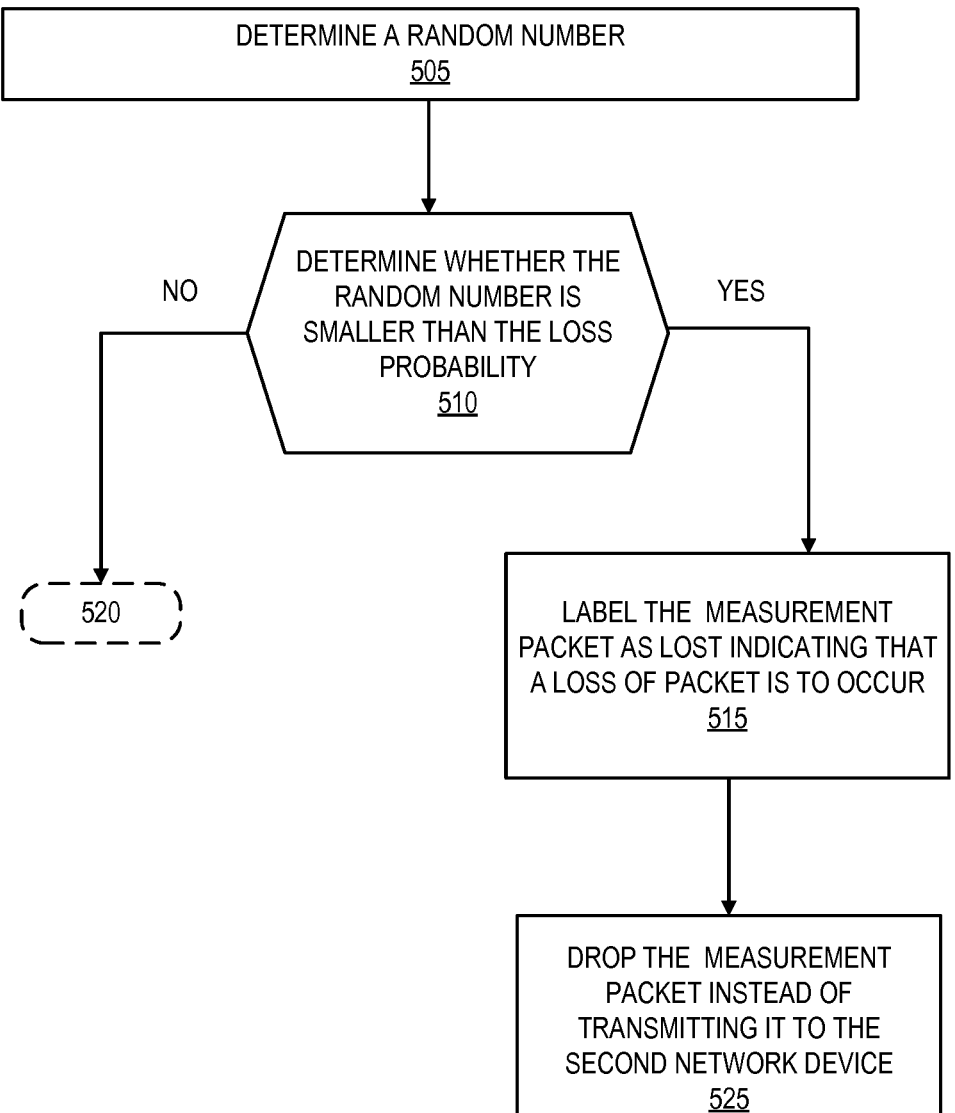
FIG. 5A illustrates a flow diagram of exemplary operations for responding to the measurement packet when the measurement model is a loss model, in accordance with one embodiment.

In some embodiments, the measurement model determined at operation 325 is a loss model. In these embodiments, the measurement determined at operation 335 is a probability of loss of the received measurement packet that indicates the likelihood by which the packet would have been lost if it were sent to the WD 103A. FIG. 5A illustrates a flow diagram of exemplary operations for responding to the measurement packet when the measurement model is a loss model, in accordance with one embodiment. At operation 505, the gateway device 102 determines a random number. At operation 510, the gateway device 102 determines whether the random number is smaller than the loss probability. When the random number is determined to be smaller than the loss probability, the flow moves to operation 515, at which the measurement packet is labeled as lost indicating that a loss of the packet is to occur. At operation 525, the measurement packet is dropped instead of being transmitting back to the controller 110 or being transmitted to the WD 103A.

Figure 5B:
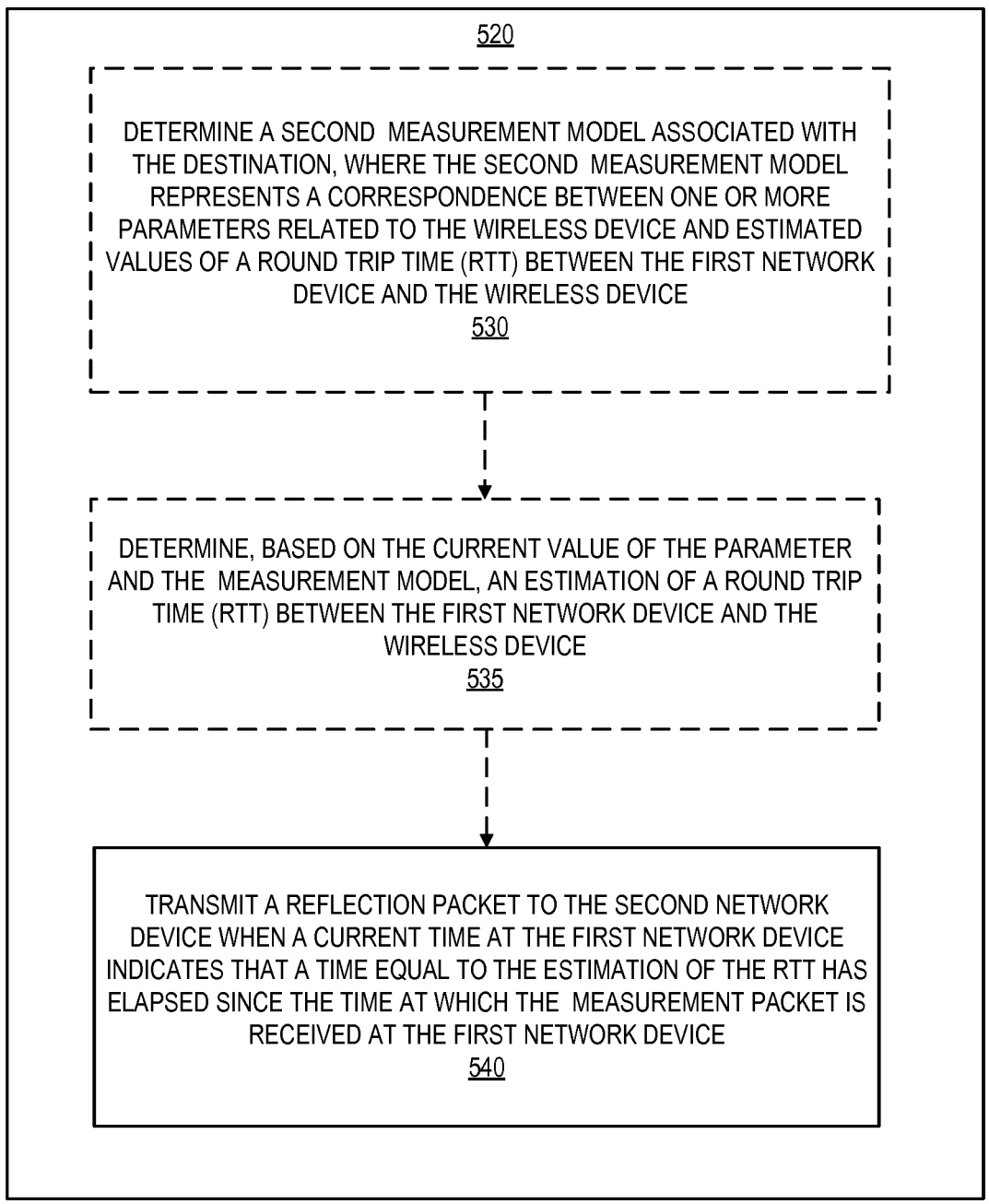
FIG. 5B illustrates a flow diagram of exemplary operations for responding to the measurement packet when the measurement model is a RTT model, in accordance with one embodiment.

In some embodiments, the gateway device 102 is operative to determine a loss model and an RTT model for each received measurement packet from the controller 110. In these embodiments, following the determination of the loss mode and the determination at operation 510, that the random number is not smaller than the loss probability, the flow moves to operation 520, where the RTT model is used to determine an estimated RTT to be used for transmitting the measurement packet to the controller 110. FIG. 5B illustrates a flow diagram of exemplary operations for responding to the measurement packet when the measurement model is a RTT model, in accordance with one embodiment. At operation 530, the gateway device 102 determines a second measurement model associated with the destination. The second measurement model being an RTT model. The second measurement model represents a correspondence between one or more parameters related to the wireless device and estimated values of a round trip time (RTT) between the gateway device 102 and the wireless device WD 103A. Flow then moves to operation 535, at which the gateway device 102 determines, based on the current value of the parameter and the second measurement model, an estimation of RTT between the gateway device 102 and the WD 103A. At operation 540, the gateway device 103A transmits a reflection packet to the controller 110 when a current time at the first network device indicates that a time equal to the estimation of the RTT has elapsed since the time at which the measurement packet is received at the first network device.

In some embodiments, the gateway device is operative to use only one of the two models, i.e., loss or RTT model. In these embodiments, if the loss model is used, the operations 520 are skipped. In other embodiments, if the RTT model is used, the operation of responding to the measurement packet includes operation 540 and the reflection packet is sent to the controller 110.

Figure 5C:
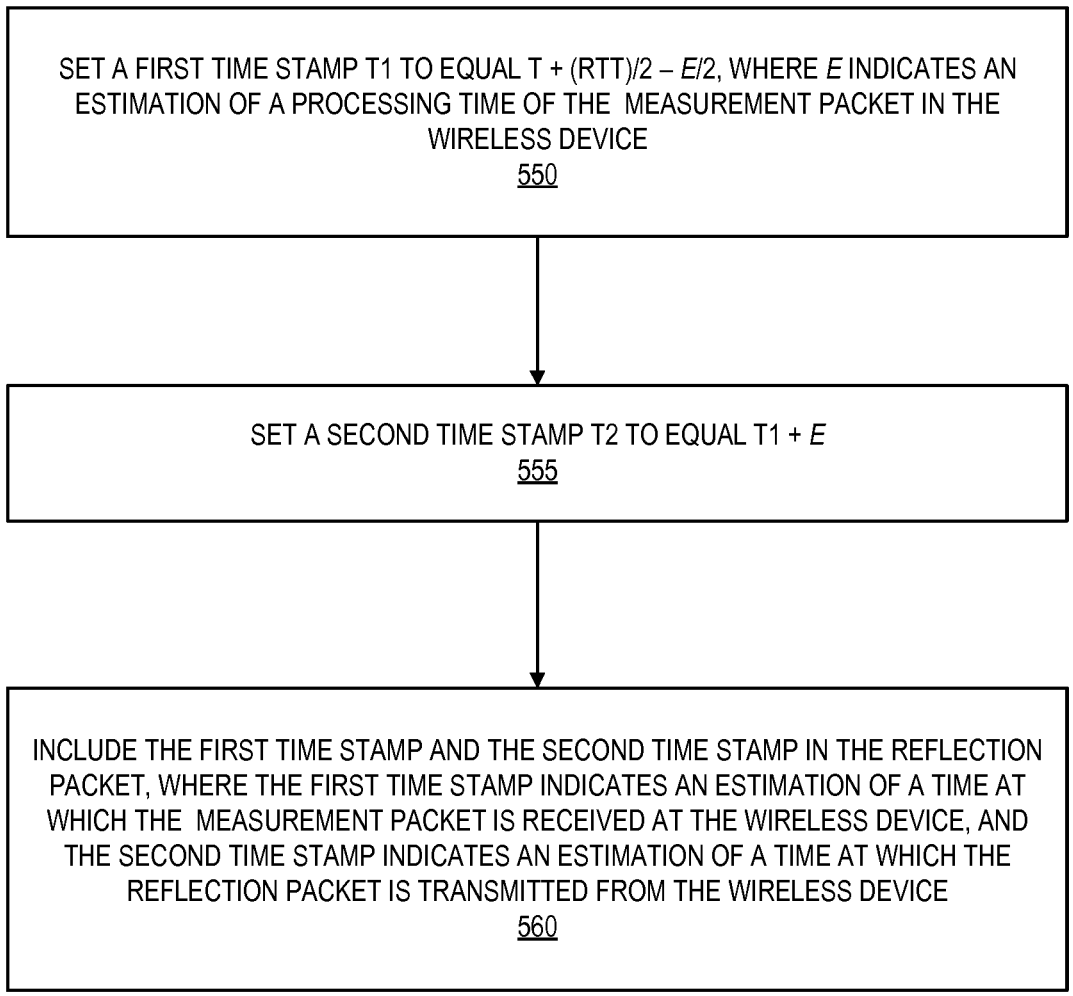
FIG. 5C illustrates a flow diagram of exemplary operations for determining time stamps for transmitting the reflection packet towards the controller, in accordance with some embodiments.

FIG. 5C illustrates a flow diagram of exemplary operations for determining time stamps for transmitting the reflection packet towards the controller, in accordance with some embodiments. In some embodiments, the active measurement protocol used to exchange measurement packets and determine measurements of a WD may require the reflector packet to include a first time stamp indicating the time at which the measurement packet is received at the destination as well as a second time stamps indicating the time at which the reflection packet is transmitted from the destination to the originating network device (to the controller for example). In the embodiments described above, when the gateway device determines an estimation of the RTT between the gateway device and the WD 103A, the gateway device 102 may also determine an estimation of the first time stamp and the second time stamp. In some embodiments, the gateway device performs the operation of FIG. 5C to determine the estimated first time stamp and the estimated second time stamp.

At operation 550, the gateway device 102 sets a first time stamp T1 to equal T+(RTT)/2−e/2. T is the time at which the measurement packet is received from the controller 110 at the gateway device 102. RTT is the estimation of the RTT determined at operation 335. e indicates an estimation of a processing time of the measurement packet in the wireless device. The estimation of processing time of the measurement packet can be determined based on a model built based on real measurements recorded and machine learning methods, such as linear regressions or random forests, by the gateway device 102 during an initialization phase. This model can be updated at regular interval to take into account changes in the environment of the WD and its traffic load. Flow then moves to operation 555, at which the gateway device 102 sets a second time stamp T2 to equal T1+e. The first time stamp and the second time stamp are included in the reflection packet, at operation 560. The first time stamp indicates an estimation of a time at which the measurement packet would have been received at the WD 103A, and the second time stamp indicates an estimation of a time at which the reflection packet would have been transmitted from the WD 103A. As a non-limiting example, TWAMP may be used as a measurement protocol and upon transmitting the reflection packet, the gateway device 102 adds the first and the second time stamps.

In some embodiments, the active measurement protocol used for transmitting the measurement packet and the reflection packet does not require the estimation of the time of receipt and transmission of the measurement packet. In these embodiments, the operations 550-560 are skipped. As a non-limiting example, ICMP can be used as measurement protocol and upon transmitting the reflection packet, the gateway device 102 does not add the first and the second time stamps.

In some embodiments, when the reflection packet is transmitted to the controller 110, the gateway device 102 may further transmit an indication that the reflection packet is a result of an estimation based on a model and does not represent an actual measurement from the WD 103A. In a non-limiting example, when TWAMP is used as the active measurement protocol, a TWAMP padding can contain a field indicating that the timestamps T1 and T2 are generated by a model rather than being read from a clock by the reflector. In some embodiments, this indication can be included in the reflection packet, in other embodiments, the indication can be transmitted separately of the reflection packet.

The embodiments described above provide methods and systems for enabling active measurements in IoT systems. As it was shown above, the invention described enable low energy consumption of the IoT devices in the wireless networks. A wireless device, e.g., WD 103A, that is the object of performance/availability measurements does not need to receive measurement packets, construct measurement reflection packets, and transmit the reflection packets. Instead a gateway device 102 performs these operations on behalf of the wireless device by estimating the measurement based on one more models associated with the wireless device. Further, if the WN includes multiple hops, each forwarding network device can avoid performing this activity. Thus, the embodiments of the present invention minimize the energy consumption and also lower the network overhead. In many deployment scenarios, WDs may have limited transmission capacity and the present invention lowers the amount of administrative traffic, such as active measurement packets, that need to be handled by the WDs. In addition, the present invention provides a uniform interface for observing wireless network performance. For example, one can use standardized network protocols such as TWAMP or ICMP.

Architecture

Figure 7:
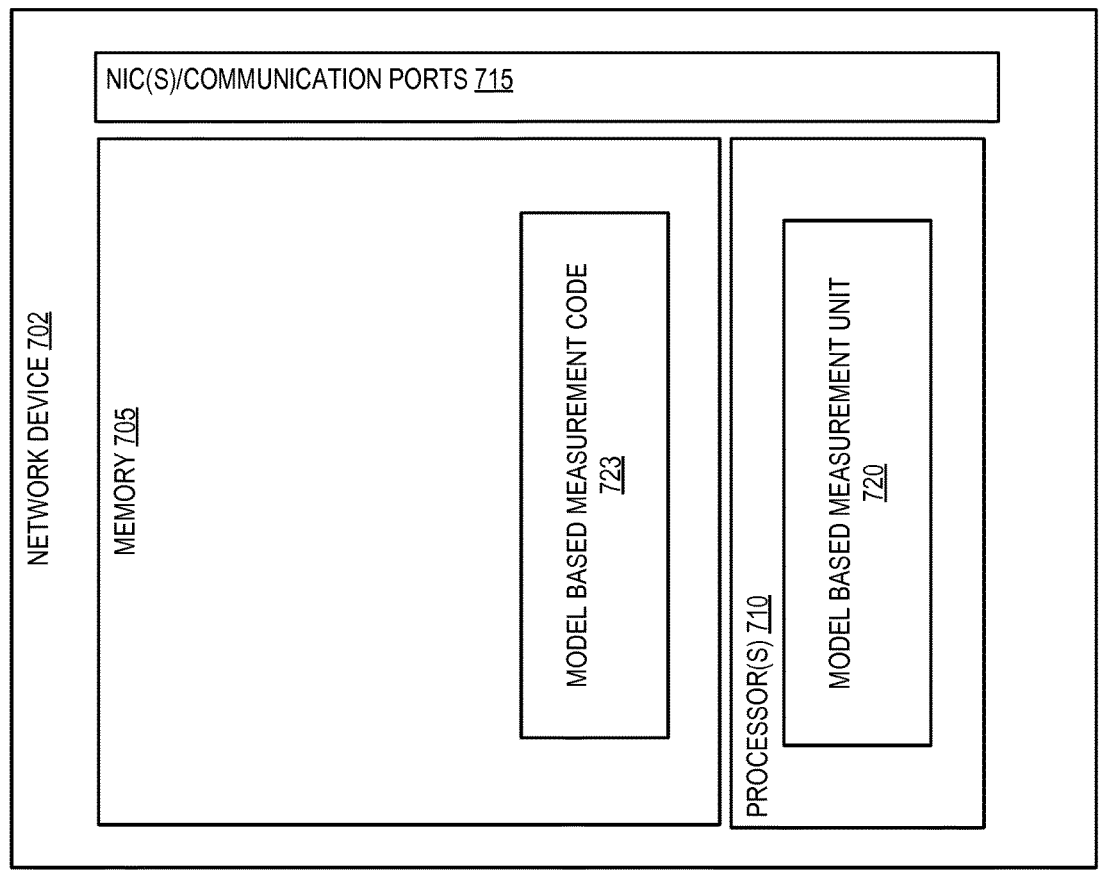
FIG. 7 is a diagram of one embodiment of a network device that can implement model based measurement, in accordance with one embodiment.

FIG. 7 is a diagram of one embodiment of a network device that can implement model based measurement, in accordance with one embodiment.

The physical component (i.e., hardware) 702 is a network device that can perform some or all of the operations and methods described above with respect to the gateway device 102 for one or more of the embodiments. The network device 702 can include one or more network interface controllers (NICs; also known as network interface cards) 715, processor(s) ("processor circuitry") 710, memory 705, a model based measurement unit 720.

The processor(s) 710 may include one or more data processing circuits, such as a general purpose and/or special purpose processor (e.g., microprocessor and/or digital signal processor). The processor(s) is configured to execute the model based measurement unit 720, to perform some or all of the operations and methods described above for one or more of the embodiments, such as the embodiments of FIGS. 1-6B. The processor can execute model based measurement unit code 723 stored in the non-transitory computer readable medium, to perform some or all of the operations and methods described above.

Figure 8:
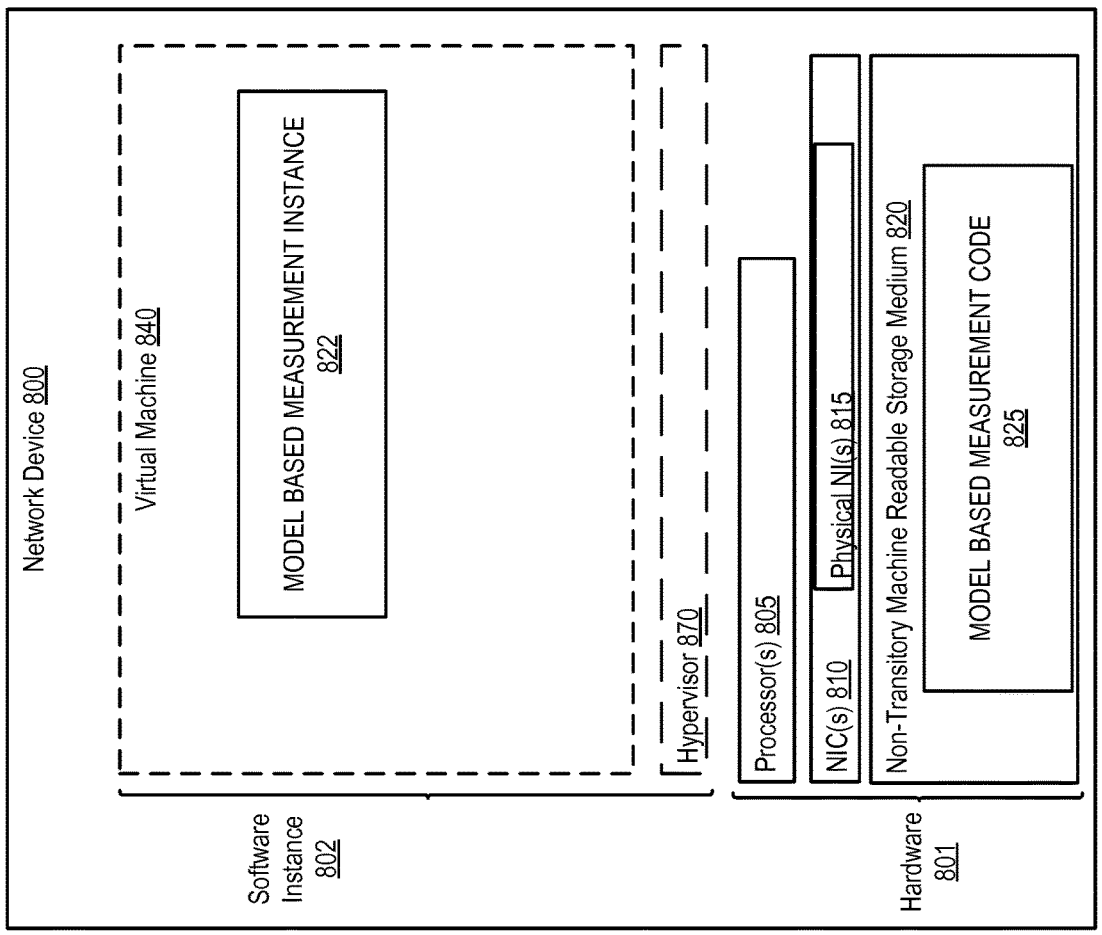
FIG. 8 is a diagram of one embodiment of a network device that can implement model based measurement, in accordance with one embodiment.

FIG. 8 is a diagram of one embodiment of a network device that can implement model based measurement, in accordance with one embodiment.

The network device 800 includes hardware 801 comprising a set of one or more processor(s) 805 (which are often commercial off-the-shelf COTS processors) and NIC(s) 810 (which include physical NIs 815), as well as non-transitory machine readable storage medium 820 having stored therein a model based measurement code 825. A physical NI 815 is hardware in a network device 800 through which a network connection (e.g., wirelessly through a wireless network interface controller (WNIC) or through plugging in a cable to a physical port connected to a NIC 810) is made. During operation, the processor(s) 805 may execute software to instantiate a hypervisor 870 (sometimes referred to as a virtual machine monitor (VMM)) and a virtual machine 840 that is run by the hypervisor 870, which is collectively referred to as software instance 802. A virtual machine 840 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. The virtual machines 840, and that part of the hardware 801 that executes that virtual machine (be it hardware dedicated to that virtual machine and/or time slices of hardware temporally shared by that virtual machine with others of the virtual machine(s)), may form a separate virtual CNSM.

For instance, the hypervisor 870 may present a virtual operating platform that appears like networking hardware to virtual machine 840, and the virtual machine 840 may be used to implement functionality of the model based measurement. While one embodiment implements virtualization with the hypervisor 870 and virtual machines 840, alternative embodiments may use other techniques (e.g., using operating system level virtualization where, instead of a hypervisor and virtual machines, the kernel of the operating system allows for multiple user space instances (often called software containers, virtualization engines, virtual private servers, or jails) that may execute a virtualized model based measurement.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first network device of enabling active measurement in a network path between a second network device acting as a controller of a network performance observability protocol and a wireless device, wherein the first network device is located between the second network device and the wireless device, the method comprising:
    capturing a measurement packet from the second network device;
    determining a destination of the measurement packet, wherein the destination of the measurement packet is the wireless device;
    determining a measurement model associated with the destination of the measurement packet, wherein the measurement model represents a correspondence between one or more parameters related to the wireless device and estimated values of a measurement for the wireless device;
    determining a current value of a parameter related to the wireless device;
    predicting, based on the current value of the parameter and the measurement model, a current estimation of the measurement for the wireless device; and
    responding to the measurement packet based on the current estimation of the measurement while avoiding to transmit the measurement packet to the wireless device.

2. The method of claim 1 further comprising determining a time (T) at which the measurement packet is received at the first network device.

3. The method of claim 1, wherein responding to the measurement packet based on the current estimation of the measurement includes labelling the measurement packet as lost indicating that a loss of packet is to occur at the wireless device.

4. The method of claim 1, wherein the current estimation of the measurement includes a loss probability indicating a probability with which the measurement packet is to be lost at the wireless device.

5. The method of claim 4, further comprising:
    determining a random number;
    wherein labelling the measurement packet as lost is performed in response to determining that the random number is smaller than the loss probability; and
    dropping the measurement packet instead of transmitting it to the second network device.

6. The method of claim 5, wherein the measurement model is a first measurement model and the method further comprises:
    responsive to determining that the random number is greater than the loss probability, performing the following:

determining a second measurement model associated with the destination, wherein the second measurement model represents a correspondence between one or more parameters related to the wireless device and estimated values of a round trip time (RTT) between the first network device and the wireless device, and determining, based on the current value of the parameter and the second measurement model, an estimation of a round trip time (RTT) between the first network device and the wireless device.

7. The method of claim 1, wherein the current estimation of the measurement includes an estimation of a round trip time (RTT) between the first network device and the wireless device.

8. The method of claim 7, wherein the method further comprises:

transmitting a reflection packet to the second network device when a current time at the first network device indicates that a time equal to the estimation of the RTT has elapsed since the time at which the measurement packet is received at the first network device.

9. The method of claim 8 further comprising:

setting a first time stamp T1 to equal T+(RTT)/2−e/2, wherein e indicates an estimation of a processing time of the measurement packet in the wireless device;

setting a second time stamp T2 to equal T1+e; and including the first time stamp and the second time stamp in the reflection packet, wherein the first time stamp indicates an estimation of a time at which the measurement packet would have been received at the wireless device, and the second time stamp indicates an estimation of a time at which the reflection packet would have been transmitted from the wireless device.

10. The method of claim 1, wherein the wireless device is at least one of wireless sensing device and an actuator.

11. The method of claim 1, wherein the parameter is at least one of a sensor measurement, a value of a radio metric, a coordinates indicating the position of the wireless device in a coordinate system, a distance between the first network device and the wireless device.

12. The method of claim 1, wherein the measurement model is created based on machine-learning techniques by observing at least one of measurement packets and traffic packets transmitted between the wireless device and the first network device and observing values of one or more parameters related to the wireless device.

13. A first network device for enabling active measurement in a network path between a second network device acting as a controller of a network performance observability protocol and a wireless device, wherein the first network device is located between the second network device and the wireless device, the first network device comprising:

a non-transitory computer readable medium to store instructions; and a processor coupled with the non-transitory computer readable medium to process the stored instructions to:

capture a measurement packet from the second network device, determine a destination of the measurement packet, wherein the destination of the measurement packet is the wireless device, determine a measurement model associated with the destination of the measurement packet, wherein the measurement model represents a correspondence between one or more parameters related to the wireless device and estimated values of a measurement for the wireless device, determine a current value of a parameter related to the wireless device, predicting, based on the current value of the parameter and the measurement model, a current estimation of the measurement for the wireless device, and respond to the measurement packet based on the current estimation of the measurement while avoiding to transmit the measurement packet to the wireless device.

14. The first network device of claim 13, wherein the processor is further to determine a time (T) at which the measurement packet is received at the first network device.

15. The first network device of claim 13, wherein to respond to the measurement packet based on the current estimation of the measurement includes to label the measurement packet as lost indicating that a loss of packet is to occur at the wireless device.

16. The first network device of claim 13, wherein the current estimation of the measurement includes a loss probability indicating a probability with which the measurement packet is to be lost at the wireless device.

17. The first network device of claim 16, wherein the processor is further to:

determine a random number;

wherein to label the measurement packet as lost is performed in response to determining that the random number is smaller than the loss probability; and drop the measurement packet instead of transmitting it to the second network device.

18. The first network device of claim 17, wherein the measurement model is a first measurement model and the processor is further to:

responsive to determining that the random number is greater than the loss probability, perform the following:

determine a second measurement model associated with the destination, wherein the second measurement model represents a correspondence between one or more parameters related to the wireless device and estimated values of a round trip time (RTT) between the first network device and the wireless device, and determine, based on the current value of the parameter and the second measurement model, an estimation of a round trip time (RTT) between the first network device and the wireless device.

19. The first network device of claim 13, wherein the current estimation of the measurement includes an estimation of a round trip time (RTT) between the first network device and the wireless device.

20. The first network device of claim 19, wherein the processor is further to:

transmit a reflection packet to the second network device when a current time at the first network device indicates that a time equal to the estimation of the RTT has elapsed since the time at which the measurement packet is received at the first network device.

21. The first network device of claim 20, wherein the processor is further to:

set a first time stamp T1 to equal T+(RTT)/2−e/2, wherein e indicates an estimation of a processing time of the measurement packet in the wireless device;

set a second time stamp T2 to equal T1+e; and include the first time stamp and the second time stamp in the reflection packet, wherein the first time stamp indicates an estimation of a time at which the measurement packet would have been received at the wireless device, and the second time stamp indicates an estimation of a time at which the reflection packet would have been transmitted from the wireless device.

22. The first network device of claim 13, wherein the wireless device is at least one of wireless sensing device and an actuator.

23. The first network device of claim 13, wherein the parameter is at least one of a sensor measurement, a value of a radio metric, a coordinates indicating the position of the wireless device in a coordinate system, a distance between the first network device and the wireless device.

24. The first network device of claim 13, wherein the measurement model is created based on machine-learning techniques by observing at least one of measurement packets and traffic packets transmitted between the wireless device and the first network device and observing values of one or more parameters related to the wireless device.

25. A non-transitory computer-readable storage medium that provides instructions, which when executed by a processor of a first network device, cause said processor to enable active measurement in a network path between a second network device acting as a controller of a network performance observability protocol and a wireless device, wherein the first network device is located between the second network device and the wireless device, by performing operations comprising:
    capturing a measurement packet from the second network device;
    determining a destination of the measurement packet, wherein the destination of the measurement packet is the wireless device;
    determining a measurement model associated with the destination of the measurement packet, wherein the measurement model represents a correspondence between one or more parameters related to the wireless device and estimated values of a measurement for the wireless device;
    determining a current value of a parameter related to the wireless device;
    predicting, based on the current value of the parameter and the measurement model, a current estimation of the measurement for the wireless device; and
    responding to the measurement packet based on the current estimation of the measurement while avoiding to transmit the measurement packet to the wireless device.

26. The non-transitory computer-readable storage medium of claim 25, wherein the operations further comprise determining a time (T) at which the measurement packet is received at the first network device.

27. The non-transitory computer-readable storage medium of claim 25, wherein responding to the measurement packet based on the current estimation of the measurement includes labelling the measurement packet as lost indicating that a loss of packet is to occur at the wireless device.

28. A non-transitory computer-readable storage medium of claim 25, wherein the current estimation of the measurement includes a loss probability indicating a probability with which the measurement packet is to be lost at the wireless device.

29. A non-transitory computer-readable storage medium of claim 28, wherein the operations further comprise:
    determining a random number;
    wherein labelling the measurement packet as lost is performed in response to determining that the random number is smaller than the loss probability; and
    dropping the measurement packet instead of transmitting it to the second network device.

30. The non-transitory computer-readable storage medium of claim 29, wherein the measurement model is a first measurement model and the operations further comprise:
    responsive to determining that the random number is greater than the loss probability, performing the following:
        determining a second measurement model associated with the destination, wherein the second measurement model represents a correspondence between one or more parameters related to the wireless device and estimated values of a round trip time (RTT) between the first network device and the wireless device, and
        determining, based on the current value of the parameter and the second measurement model, an estimation of a round trip time (RTT) between the first network device and the wireless device.

31. The non-transitory computer-readable storage medium of claim 25, wherein the current estimation of the measurement includes an estimation of a round trip time (RTT) between the first network device and the wireless device.

32. The non-transitory computer-readable storage medium of claim 31, wherein the operations further comprise:
    transmitting a reflection packet to the second network device when a current time at the first network device indicates that a time equal to the estimation of the RTT has elapsed since the time at which the measurement packet is received at the first network device.

33. The non-transitory computer-readable storage medium of claim 32, wherein the operations further comprise:
    setting a first time stamp T1 to equal $T+(RTT)/2-e/2$, wherein e indicates an estimation of a processing time of the measurement packet in the wireless device;
    setting a second time stamp T2 to equal $T1+e$; and
    including the first time stamp and the second time stamp in the reflection packet, wherein the first time stamp indicates an estimation of a time at which the measurement packet would have been received at the wireless device, and the second time stamp indicates an estimation of a time at which the reflection packet would have been transmitted from the wireless device.

34. The non-transitory computer-readable storage medium of claim 25, wherein the wireless device is at least one of wireless sensing device and an actuator.

35. The non-transitory computer-readable storage medium of claim 25, wherein the parameter is at least one of a sensor measurement, a value of a radio metric, a coordinates indicating the position of the wireless device in a coordinate system, a distance between the first network device and the wireless device.

36. The non-transitory computer-readable storage medium of claim 25, wherein the measurement model is created based on machine-learning techniques by observing at least one of measurement packets and traffic packets transmitted between the wireless device and the first network device and observing values of one or more parameters related to the wireless device.

* * * * *